(12) United States Patent
You

(10) Patent No.: US 12,036,741 B2
(45) Date of Patent: Jul. 16, 2024

(54) CHAMBER ENVIRONMENT CONTROLLING APPARATUS FOR THREE-DIMENSIONAL BIOPRINTER

(71) Applicant: ROKIT HEALTHCARE INC., Seoul (KR)

(72) Inventor: Seok Hwan You, Seoul (KR)

(73) Assignee: ROKIT HEALTHCARE INC., Seoul (KR)

( * ) Notice: Subject to any disclaimer, the term of this patent is extended or adjusted under 35 U.S.C. 154(b) by 0 days.

(21) Appl. No.: 17/439,587

(22) PCT Filed: Jun. 3, 2021

(86) PCT No.: PCT/KR2021/006965
§ 371 (c)(1),
(2) Date: Sep. 15, 2021

(87) PCT Pub. No.: WO2021/251688
PCT Pub. Date: Dec. 16, 2021

(65) Prior Publication Data
US 2023/0085743 A1 Mar. 23, 2023

(30) Foreign Application Priority Data
Jun. 9, 2020 (KR) .................. 10-2020-0069919

(51) Int. Cl.
*B33Y 30/00* (2015.01)
*B29C 64/295* (2017.01)
(Continued)

(52) U.S. Cl.
CPC .......... *B29C 64/364* (2017.08); *B29C 64/295* (2017.08); *B29C 64/386* (2017.08);
(Continued)

(58) Field of Classification Search
None
See application file for complete search history.

(56) References Cited

U.S. PATENT DOCUMENTS

2011/0126592 A1* 6/2011 De Angelis .............. C03B 5/16
65/180
2019/0177676 A1 6/2019 Chow

FOREIGN PATENT DOCUMENTS

| CN | 106222085 A | 12/2016 |
| JP | 2018145526 A | 9/2018 |

(Continued)

OTHER PUBLICATIONS

International Search Report issued in International Application No. PCT/KR2021/006965 dated Sep. 15, 2021 (4 pages).

*Primary Examiner* — Yung-Sheng M Tsui
(74) *Attorney, Agent, or Firm* — Osha Bergman Watanabe & Burton LLP

(57) ABSTRACT

The present invention relates to a chamber environment controlling apparatus for a three-dimensional bioprinter including a printing chamber having an internal space in which printing is performed and which is defined by wall surfaces including sidewalls. The apparatus may include a temperature adjustor including a heater configured to heat the internal space of the printing chamber and an air circulator including an air guide portion extending from an outside of the printing chamber along a sidewall on one side and formed so that air flowing in through an inlet moves along an inside, is heated by the temperature adjustor, and is discharged into the internal space of the printing chamber through an outlet, a circulation fan configured to circulate air along the air guide portion, and a filter configured to filter the air circulating along the air guide portion.

10 Claims, 6 Drawing Sheets

(51) Int. Cl.
*B29C 64/364* (2017.01)
*B29C 64/386* (2017.01)
*B33Y 40/00* (2020.01)
*B33Y 50/00* (2015.01)

(52) U.S. Cl.
CPC ............... *B33Y 30/00* (2014.12); *B33Y 40/00* (2014.12); *B33Y 50/00* (2014.12)

(56) References Cited

FOREIGN PATENT DOCUMENTS

| | | | |
|---|---|---|---|
| KR | 101876799 B1 | * | 4/2017 |
| KR | 2017-0088874 A | | 8/2017 |
| KR | 20190019540 A | * | 8/2017 |
| KR | 20190058880 A | | 5/2019 |
| KR | 102065474 B1 | | 1/2020 |

* cited by examiner

[Fig. 1]
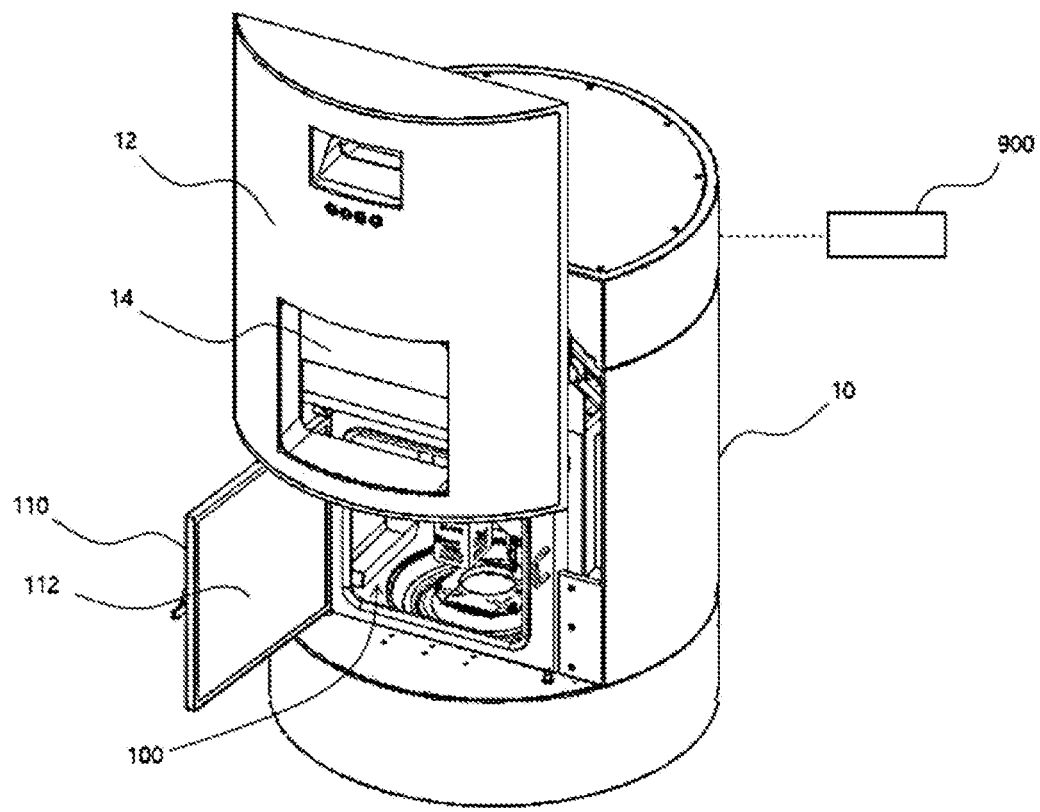

[Fig. 2]
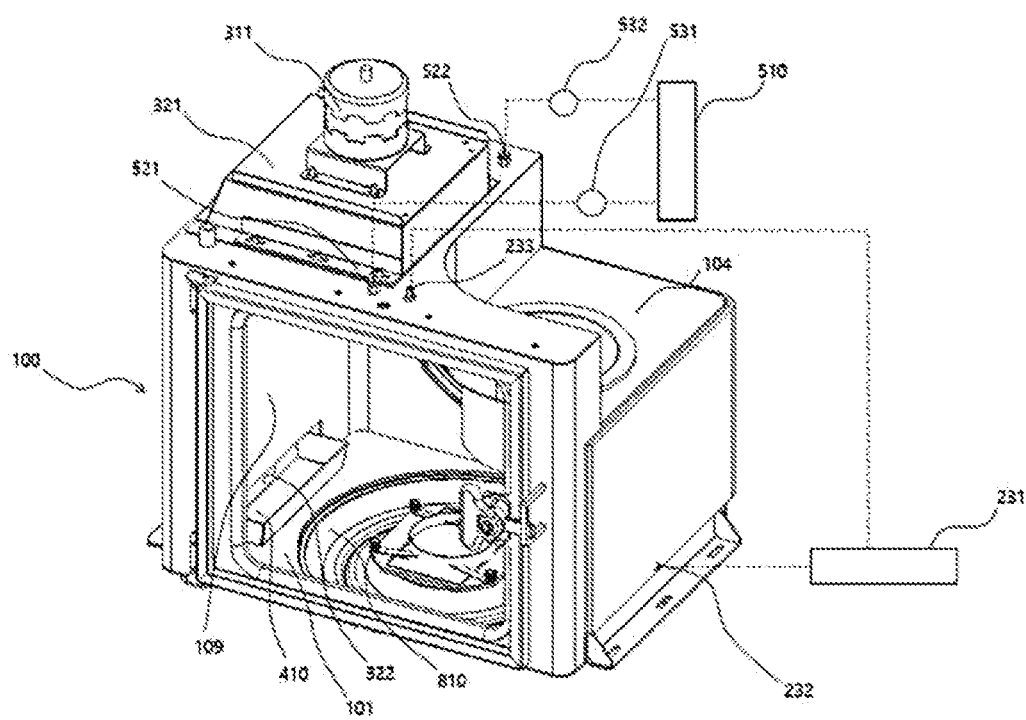

[Fig. 3]
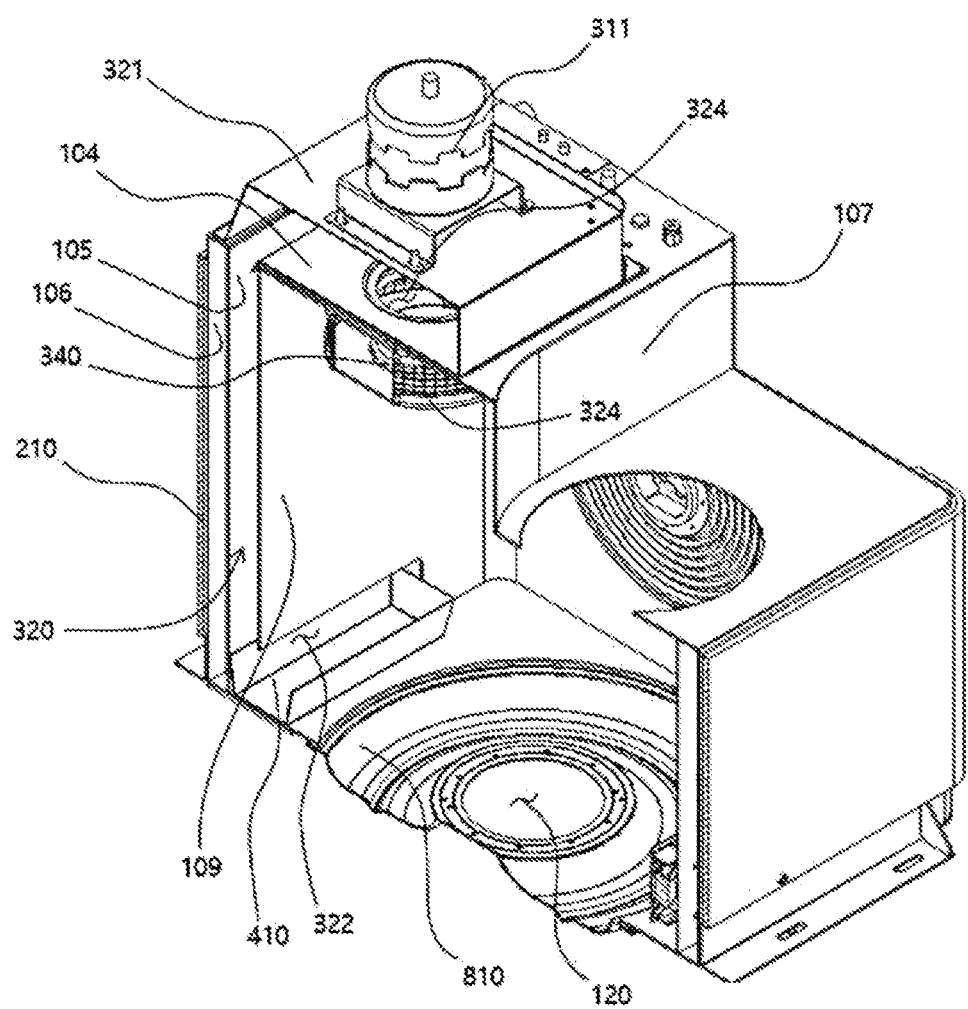

[Fig. 4]
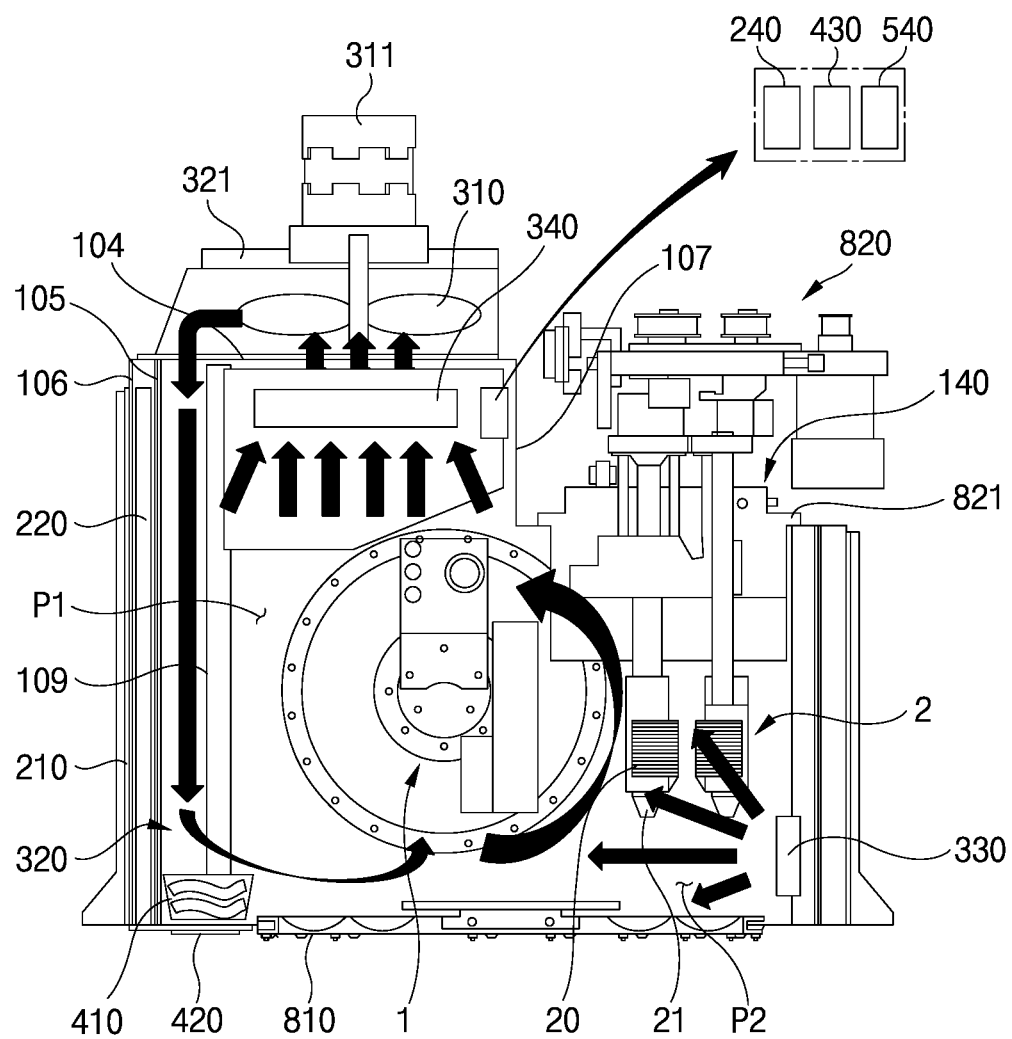

[Fig. 5]
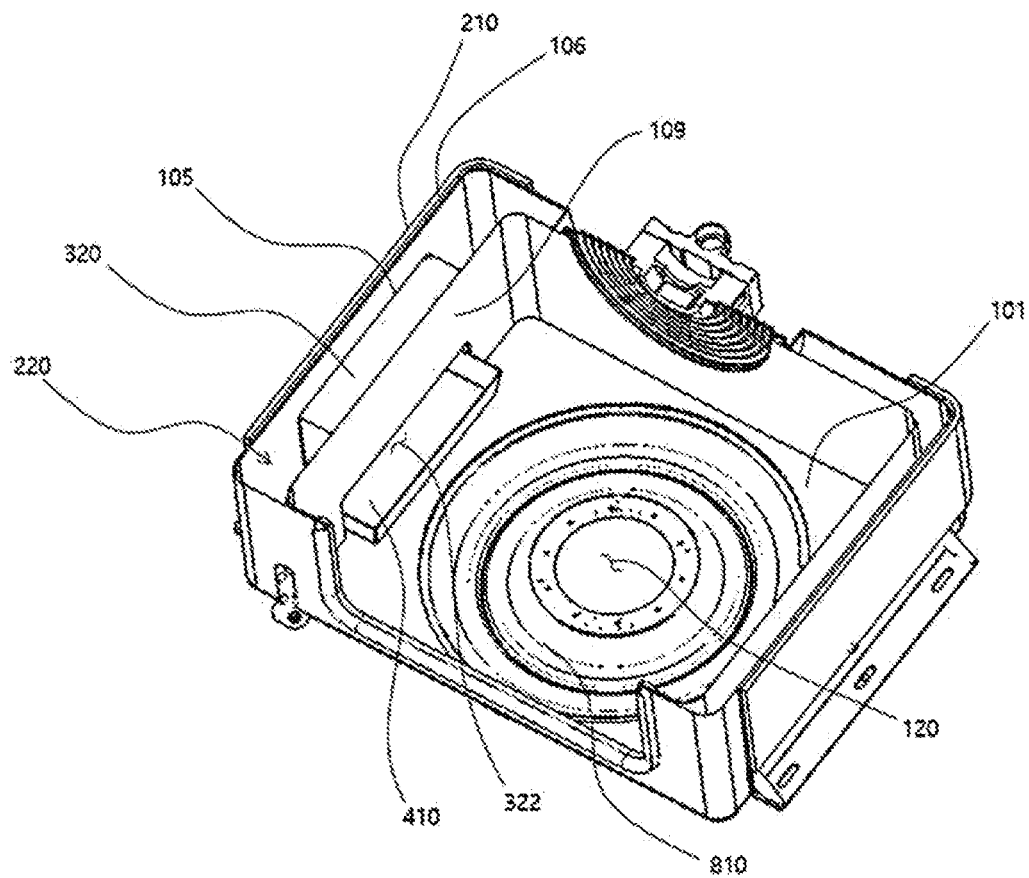

[Fig. 6]
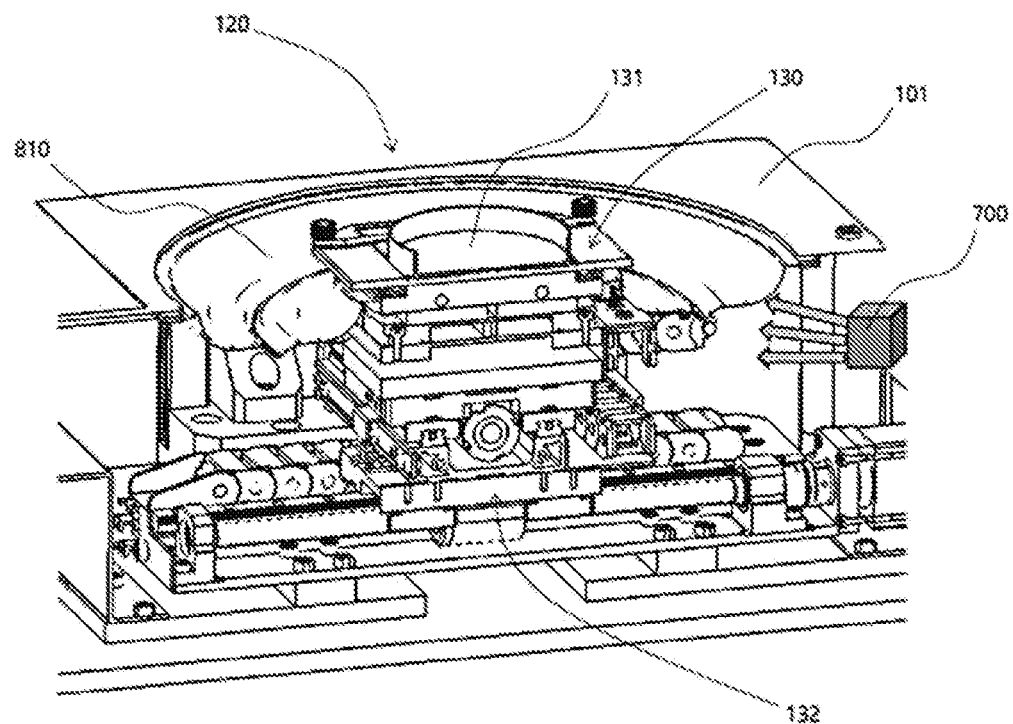

CHAMBER ENVIRONMENT CONTROLLING APPARATUS FOR THREE-DIMENSIONAL BIOPRINTER

TECHNICAL FIELD

The present invention relates to a chamber environment controlling apparatus for a three-dimensional bioprinter, and more particularly, to a chamber environment controlling apparatus for a three-dimensional bioprinter to adjust an environment including an internal temperature, humidity, and the like of a chamber of the three-dimensional bioprinter.

BACKGROUND ART

Three-dimensional bioprinting where a three-dimensional printing technique is applied thereto and developed therein is a technique of forming a desired shape by coupling an extracellular matrix (hereinafter, referred to as ECM) such as collagen or bio-ink emulating the same with cells and other biomaterials on the basis of the three-dimensional printing technique. Currently, a variety of three-dimensional bioprinting methods have been developed in accordance with a desired purpose and biological environment and a variety of bio-inks have also been studied in addition thereto.

The three-dimensional bioprinting includes an ECM or bio-ink in a desired form and cultivates cells necessary for the ECM or bio-ink so as to manufacture a vital organ or tissue having a function like a real thing. One of the most important issues in three-dimensional bioprinting is to accommodate cells and biomaterials which become materials to be maximally safe and usable so as to allow cells not to die and to continuously function.

Patent Document 1 (Korean Patent Registration No. 10-2065474) discloses a three-dimensional bioprinter configured to output cells and an ECM or bio-ink at different temperatures and pressures using a plurality of nozzles.

In Patent Document 1, there is disclosed an ejection temperature adjustor included in a nozzle portion through which each of biomaterials is ejected and configured to adjust a temperature of the ejected biomaterial. Also, there is disclosed a temperature adjusting member included in an output and storage stage and configured to adjust a temperature of the biomaterial after ejection.

Also, an air purification means such as a high efficiency particulate air (HEPA) filter, a fan, and the like is installed in a chamber of the three-dimensional bioprinter and prevents an inside of a case from being contaminated when external air flows therein so that air circulation occurs in the chamber.

Accordingly, since biomaterials receive an influence of the air circulation in the chamber in the conventional three-dimensional bioprinter as disclosed in Patent Document 1, it is significant to adequately adjust an environment such as a temperature, humidity, and the like in the chamber.

However, since it is difficult to adjust the environment, such as the temperature, humidity, and the like, in the chamber only using the components which adjust temperatures of the nozzle portion and the output and storage stage, there is a limitation in increasing survivability and stability of biomaterials.

RELATED ART DOCUMENT

Patent Document

Patent Document 1: Korean Patent Registration No. 10-2065474 (published on Jan. 14, 2020)

DISCLOSURE

Technical Problem

The present invention is directed to providing a chamber environment controlling apparatus for a three-dimensional bioprinter which is configured to increase survivability and stability of ejected biomaterials by adjusting an environment such as an internal temperature, humidity, and the like of a chamber of the three-dimensional bioprinter.

Technical Solution

One aspect of the present invention provides a chamber environment controlling apparatus for a three-dimensional bioprinter including a printing chamber having an internal space in which printing is performed and which is defined by wall surfaces including sidewalls. The apparatus may include a temperature adjustor including a heater configured to heat the internal space of the printing chamber and an air circulator including an air guide portion extending from an outside of the printing chamber along a sidewall on one side and formed so that air flowing in through an inlet moves along an inside, is heated by the temperature adjustor, and is discharged into the internal space of the printing chamber through an outlet, a circulation fan configured to circulate air along the air guide portion, and a filter configured to filter the air circulating along the air guide portion.

The temperature adjustor includes a water jacket which is provided outside the sidewall of the printing chamber and accommodates water, and the water jacket may be formed to surround the air guide portion between the sidewall on one side of the printing chamber and the water jacket.

The filter may be installed in a filter housing, and the filter housing may be detachably mounted in the inlet inside the printing chamber.

The apparatus may include a humidity adjustor including a tray provided on a side of the outlet of the air guide portion and configured to accommodate water so as to adjust humidity inside the printing chamber.

The outlet of the air guide portion may be formed between the sidewall of the printing chamber and a bottom surface of the printing chamber, and the tray may be at least partially inserted into the air guide portion through the outlet.

The humidity adjustor may include an auxiliary humidification heater disposed below the tray and configured to heat the water accommodated in the tray.

The auxiliary humidification heater may be disposed in a space below the bottom surface of the printing chamber.

The air circulator may further include an auxiliary circulation fan provided on the sidewall of the printing chamber on a side facing the air guide portion.

The temperature adjustor may further include a cold air provider including a cold air generator disposed outside the printing chamber, a cold air inlet formed in the printing chamber to receive cold air from the cold air generator, and a cold air recovery hole formed in the printing chamber to recover cold air inside the printing chamber.

A bottom surface opening may be formed in the bottom surface of the printing chamber and bellows configured to isolate the inside of the printing chamber from a space below the bottom surface of the printing chamber by covering a space in an inner circumferential surface of the bottom surface opening may be included. Also, a fan heater configured to reduce a temperature difference between the inside of the printing chamber and the space below the bottom surface of the printing chamber may be provided in the space below the bottom surface of the printing chamber. The bellows may be plated with platinum.

The apparatus may include a $CO_2$ sensor configured to sense $CO_2$ concentration inside the printing chamber, a $CO_2$ adjustor including a $CO_2$ tank in which $CO_2$ gas is stored, a $CO_2$ gas inlet formed in the printing chamber and through which $CO_2$ gas is injected from the $CO_2$ tank into the printing chamber, a $CO_2$ balance adjusting hole formed in the printing chamber and configured to adjust the $CO_2$ concentration inside the printing chamber, and a regulator disposed on an inflow path of the $CO_2$ gas, and a controller configured to adjust an inflow rate of $CO_2$ gas along a circulation path by controlling an operation of the regulator.

Advantageous Effects

According to the present invention, survivability and safety of ejected biomaterials may be increased by adjusting an internal temperature, humidity, and the like of a chamber of the three-dimensional bioprinter.

Also, components for adjusting a temperature and humidity may be interconnected through convection so as to efficiently adjust humidity using heated air circulating through a printing chamber.

DESCRIPTION OF DRAWINGS

FIG. 1 is a perspective view of a three-dimensional bioprinter in which a chamber environment controlling apparatus for a three-dimensional bioprinter according to an embodiment of the present invention is implemented.

FIG. 2 is an external perspective view illustrating a printing chamber included in the chamber environment controlling apparatus for the three-dimensional bioprinter according to the embodiment of the present invention.

FIG. 3 is an internal incision diagram illustrating the printing chamber of FIG. 2.

FIG. 4 is an internal cross-sectional view illustrating the printing chamber of FIG. 2.

FIG. 5 is a bottom incision diagram illustrating the printing chamber of FIG. 2.

FIG. 6 is an incision diagram illustrating a space below a bottom surface of the printing chamber of FIG. 2.

MODES OF THE INVENTION

Hereinafter, details for implementing the present invention will be described with reference to the drawings. Also, in a description of embodiments of the present invention, a detailed description of a well-known technology of the related art will be omitted when it is deemed to obscure the essence of the present invention.

FIG. 1 is a perspective view of a three-dimensional bioprinter in which a chamber environment controlling apparatus for a three-dimensional bioprinter according to an embodiment of the present invention is implemented. The three-dimensional bioprinter includes a case 10 surrounding an exterior thereof, and a printing chamber 100 is disposed in the case 10. A case door 12 is installed on a front surface of the case 10. An external transparent window 14 through which the printing chamber 100 therein may be observed is provided in the case door 12.

The printing chamber 100 is accommodated in the case 10, and a chamber door 110 including an internal transparent window 112 at a location corresponding to the case door 12 is installed on a front surface of the printing chamber 100.

According to the embodiment of the present invention, the three-dimensional bioprinter adopts a double door type including the case door 12 and the chamber door 110 so as to be advantageous for isolating and sealing an inside of the printing chamber 100 from the outside.

FIG. 2 is an external perspective view of the printing chamber included in the chamber environment controlling apparatus for the three-dimensional bioprinter according to the embodiment of the present invention. FIG. 3 is an internal incision diagram illustrating the printing chamber of FIG. 2. FIG. 4 is an internal cross-sectional view illustrating the printing chamber of FIG. 2.

Referring to FIGS. 2 to 4, the printing chamber 100 includes an internal space surrounded by wall surfaces, that is, a bottom surface 101, a top surface 104, and a sidewall 109. The internal space of the printing chamber 100 is formed to be separated from the outside and sealed. A casing wall 106 is formed outside the sidewall 109 of the printing chamber 100 while being spaced apart from the sidewall 109. The casing wall 106 is formed to at least partially surround the sidewall 109 of the printing chamber 100.

A water jacket 220 which will be described below is formed in a space between the sidewall 109 and the casing wall 106. Also, the space between the sidewall 109 and the casing wall 106 located on one side becomes a path where an air guide portion 320 passes. The casing wall 106 is formed along the sidewalls 109 facing each other corresponding to left and right sides of a side on which the chamber door 110 is installed and a part of the opposite sidewall 109.

The chamber environment controlling apparatus for the three-dimensional bioprinter according to the present invention may include a temperature adjustor, an air circulator, a humidity adjustor, and a carbon dioxide ($CO_2$) adjustor which are provided in the printing chamber 100.

The temperature adjustor includes a heater 210 configured to adjust a temperature inside the printing chamber 100. The space between the sidewall 109 and the casing wall 106 of the printing chamber may form the water jacket 220 in which water is accommodated, and the heater 210 may heat the water inside the water jacket 220 so as to adjust the temperature inside the printing chamber 100.

The heater 210 is formed to have a plate shape and is installed outside the casing wall 106 of the printing chamber 100.

When the printing chamber 100 does not include the casing wall 106 and the water jacket 220, the heater 210 is attached to the sidewall 109 and directly heats the sidewall 109 so as to adjust the temperature inside the printing chamber 100.

According to the embodiment of the present invention, the heater 210 may heat the water inside the water jacket 220 and adjust the temperature inside the printing chamber 100 so as to be advantageous to forming a uniform temperature inside the printing chamber 100.

A controller 900 may receive a sensing value from a temperature sensor 240 configured to sense the temperature inside the printing chamber 100 and control turning-on/off of the heater 210.

The air circulator includes the air guide portion 320. The air guide portion 320 extends along a sidewall on one side of the printing chamber 100 and is formed so that air flowing in through an inlet 324 moves through an internal path and is ejected into the internal space of the printing chamber 100 through an outlet 322. Also, the air circulator includes a circulation fan 310 configured to circulate air filtered by a filter 340 provided in the printing chamber 100 through the inlet of the air guide portion 320.

The water jacket 220 and the air guide portion 320 are disposed between the casing wall 106 of the printing chamber 100 and the sidewall 109 of the printing chamber 100. The water jacket 220 on one side may be formed to surround the air guide portion 320 between the casing wall and the sidewall 109 on a side of the air guide portion 320. The water jacket 220 on one side and the air guide portion 320 may extend along the sidewall 109 to be adjacent to each other.

A guide wall 105 configured to define an air circulation path of the air guide portion 320 may be formed between the water jacket 220 on one side and the sidewall 109 of the printing chamber 100 to extend from the sidewall 109.

The guide wall 105 is formed to have a width smaller than a width of the sidewall 109 corresponding thereto and forms the air circulation path inside the air guide portion 320 between the sidewall 109 and the guide wall.

The air circulation path may be formed to have a shape having a rectangular cross-section and formed of the sidewall 109 as one side and the guide walls 105 as other sides. The water jacket 220 may be formed to have a staple shape to come into contact with a boundary of the guide wall 105.

The heater 210 may transfer heat to air inside the air guide portion 320 through the water jacket 220 so as to uniformly transfer heat to the inside of the printing chamber 100. Also, the water jacket 220 may be formed to surround the air guide portion 320 so as to efficiently transfer heat to the air inside the air guide portion 320.

It is more advantageous for adjusting a temperature of the printing chamber 100 to dispose the air guide portion 320 as above. According to the present invention, temperature equability and temperature variability within a range of ±0.5° C. may be achieved.

The internal space of the printing chamber 100 may be divided into a first space P1 in which the filter 340 below the circulation fan 310 is disposed and a second space P2 formed on a side of the first space P1. The second space P2 may be formed at a lower height than the first space P1.

The first space P1 is a space with the sidewall 109 of the printing chamber 100 on the air guide portion 320 side as one sidewall, and the second space P2 is a space with the sidewall 109 of the printing chamber 100 on a side facing the air guide portion 320 as one sidewall.

In the first space P1, a first output module 1 configured to output biomaterials in a solid state for forming a structure such as a scaffold, a pharmaceutical structure, a frame structure, and the like may be provided. For example, as the first output module 1, an extruder module configured to output filaments, a hot-melting module that is a melting high-pressure injector configured to melt and pneumatically output chemicals or granular polymer materials placed therein at a high temperature, and the like may be selected.

In the second space P2, a second output module 2 including an output unit 20 on which a syringe 21 accommodating biomaterials is mounted and configured to output biomaterials in a fluid state may be provided. The second output module 2 may include about five output units 20. For example, one output unit may be set to be an output state and other four output units may be set to be a standby state.

A vertical extension surface 107 extending from the top surface 104 of the second space P2 toward the top surface 104 of the first space P1 may be formed on an extension line of a boundary between the first space P1 and the second space P2. The top surface 104 of the first space P1 horizontally extends from a top end of the vertical extension surface 107 toward the sidewall 109 of the first space P1.

Above the top surface 104 of the first space P1, one side of a guide cover 321 may extend from the top surface 104, the other side extends from the guide wall 105, and the internal space in which the circulation fan 310 is accommodated may be formed. The circulation fan 310 may be rotated by a motor 311 attached outside the printing chamber 100 and may generate an air flow inside the printing chamber 100.

The filter 340 configured to filter air before reaching the circulation fan 310 is disposed below the top surface 104 of the first space P1. The filter 340 is installed inside a filter housing 342, and the filter housing 342 is detachably mounted in the inlet 324. Accordingly, the filter 340 may be easily replaced. The filter 340 may be, for example, a high efficiency particulate air (HEPA) filter or an ultra low penetration air (ULPA) filter. The filter 340 may remove contaminant materials included in air flowing in from the inside of the printing chamber 100 due to the circulation fan 310 and may perform filtration with, for example, a 0.3 micrometer particle collection rate of 99.975% (grade-H14) so as to keep the chamber clean.

The top surface 104 of the first space P1 extends toward the sidewall 109 of the printing chamber 100 which faces the vertical extension surface 107 so that an end thereof is spaced apart from the sidewall 109. Accordingly, an internal space of the guide cover 321 of the air guide portion 320 is connected to a space inside the guide wall 105 of the air guide portion 320 between the top surface 104 and the sidewall 109 and forms an air circulation space of the air guide portion 320.

The air circulated through the circulation fan 310 circulates in a path extending from a space above the top surface 104 of the first space P1 to be below the sidewall 109 through the air guide portion 320. Here, as described above, the air passing through the air guide portion 320 may be heated at an adequate temperature while passing through the water jacket 220.

According to the embodiment of the present invention, the air guide portion 320 includes the outlet 322 configured to discharge the air circulating therein into the internal space of the printing chamber 100. The humidity adjustor may include a tray 410 provided on a side of the outlet 322 of the air guide portion 320 and accommodating water so as to adjust water inside the printing chamber 100.

The outlet 322 of the air guide portion 320 may be formed between the air guide portion 320 side, that is, the sidewall 109 of the first space P1 and the bottom surface 101 of the printing chamber 100. One side of the sidewall 109 of the first space P1 may extend from the top surface 104 of the first space P1 and the other side thereof may partially extend to the bottom surface 101 of the first space P1. Another part of the sidewall 109 of the first space P1 which does not extend to the bottom surface may form the outlet 322 between the bottom surface 101 and the other part of the sidewall 109 of the first space P1.

An internal space of the first space P1 may be connected to the internal space of the printing chamber 100 through the outlet 322, and the air flowing through the air guide portion 320 may be circulated toward the internal space of the printing chamber 100 through the outlet 322. In detail, air suctioned in through the circulation fan 310 above the first space P1 and circulating through the air guide portion 320 flows into and is circulated in the printing chamber 100 through the outlet 322 at a bottom of the first space P1.

The tray 410 may be provided on the outlet 322 side of the air guide portion 320 and configured to adjust humidity inside the printing chamber using air circulation of the air circulator. The tray 410 may be disposed on a bottom surface of the first space P1 and may be formed to have an enclosure having an open top.

The tray 410 is disposed to be partially inserted into the air guide portion 320 through the outlet 322. That is, a part of the tray 410 is disposed inside the air guide portion 320 and another part thereof is disposed inside the printing chamber 100. That is, the tray 410 may be disposed below the sidewall 109 of the first space P1 which forms the outlet 322. Accordingly, evaporation and diffusion of water accommodated in the tray 410 may be efficiently induced by circulated air introduced into the internal space of the printing chamber 100 while passing through the outlet 322 and circulating.

In the present invention, humidity may be efficiently increased using heated air circulation through the printing chamber. That is, components configured to adjust a temperature and humidity may be interconnected through convection of air.

According to the embodiment of the present invention, the humidity adjustor may further include an auxiliary humidification heater 420 disposed below the tray 410 and configured to heat water accommodated in the tray 410. The auxiliary humidification heater 420 may be disposed in a space below the bottom surface 101 of the printing chamber 100. Accordingly, a cable to the auxiliary humidification heater 420 such as a power line, a control line, and the like may be connected outside the printing chamber 100.

The printing chamber 100 includes a humidity sensor 430 configured to sense humidity therein. The auxiliary humidification heater 420 is controlled by the controller 900 which receives a sensing signal of the humidity sensor 430. The auxiliary humidification heater 420 may accelerate evaporation by heating the water accommodated in the tray 410. According to the present invention, initial relative humidity inside the chamber may reach 80% RH within a short time, and humidity may be adjusted within a range of 93% RH.

According to the embodiment of the present invention, the air circulator may further include an auxiliary circulation fan 330 provided on the sidewall 109 on a side opposite the air guide portion 320, that is, the sidewall 109 of the second space P2. The auxiliary circulation fan 330 may be attached to a bottom end of the sidewall 109 of the printing chamber 100 of the second space P2. The auxiliary circulation fan 330 is oriented toward the first space P1 and generates convection in the second space P2 first by spraying air. The auxiliary circulation fan 330 may be operated with 1500 to 2500 rpm and generate $H_2O$ convection having an air volume of 0.15 to 0.2 m$^3$/min and a wind pressure of 1.3 to 2 mm in the second space P2.

The auxiliary circulation fan 330 circularly circulates air discharged through the outlet of the air guide portion 320, passing through the first space P1, and circulating through the second space P2 toward the first space P1. Accordingly, dew condensation which may occur in the printing chamber 100 may be minimized as well as promoting internal circulation of the air passing through the second space P2.

A $CO_2$ adjustor includes a $CO_2$ tank 510 in which a $CO_2$ gas is stored, a $CO_2$ gas inlet 521 through which the $CO_2$ gas is injected from the $CO_2$ tank 510 into the printing chamber 100, a $CO_2$ balance adjusting hole 522 configured to discharge air inside the printing chamber 100 to the outside of the printing chamber 100, and a regulator 531 disposed on an inflow path of the $CO_2$ gas. Also, the $CO_2$ adjustor includes a $CO_2$ sensor 540 configured to sense $CO_2$ concentration inside the printing chamber 100. The $CO_2$ sensor 540 may be an infrared (IR) sensor and periodically sense $CO_2$ concentration inside the chamber. The $CO_2$ tank 510 is disposed outside the printing chamber 100 and supplies the $CO_2$ gas to the inside of the printing chamber 100 through a tube connected to the $CO_2$ gas inlet 521.

The controller 900 may adjust an inflow rate of the $CO_2$ gas according to a sensing value input from the $CO_2$ sensor 540 by controlling an operation of the regulator 531. The controller 900 may allow the $CO_2$ concentration inside the printing chamber 100 to maintain a certain value by adjusting the inflow rate of the $CO_2$ gas using the regulator 531.

The $CO_2$ gas inlet 521 and the $CO_2$ balance adjusting hole 522 may be formed to pass through the top surface 104 of the printing chamber 100 on the first space P1 side on which the circulation fan 310 is disposed. The $CO_2$ gas may be injected from the $CO_2$ tank 510 into the $CO_2$ gas inlet 521 and the air inside the chamber 100 may be discharged outward through the $CO_2$ balance adjusting hole 522 so as to adjust the $CO_2$ concentration inside the printing chamber 100. As the $CO_2$ gas is injected through the $CO_2$ gas inlet 521, pressure inside the printing chamber 100 is a high pressure in comparison to that of the outside. Here, opening and closing of the $CO_2$ balance adjusting hole 522 may be adjusted using a valve 532 so as to naturally discharge the air inside the printing chamber 100 which includes the $CO_2$ gas to the outside.

The regulator 531 may be provided on an extending path between the $CO_2$ tank 510 and the $CO_2$ gas inlet 521 and may adjust pressure of the $CO_2$ gas flowing into the printing chamber 100.

Also, the controller 900 may adjust inflow and discharge rates of the $CO_2$ gas by controlling operations of the regulator 531 and the valve 532 which are disposed on a circulation path of the $CO_2$ gas. When the $CO_2$ concentration inside the printing chamber 100 is higher than a set value, the valve 532 may be opened so as to naturally discharge the air inside the printing chamber 100 to the outside. Simultaneously, as described above, the concentration of the $CO_2$ gas inside the printing chamber 100 may be adjusted while adjusting the pressure of the $CO_2$ gas flowing into the printing chamber 100 using the regulator 531. According to the present invention, $CO_2$ concentration of 3 to 5% may be maintained and $CO_2$ concentration accuracy within a range of ±0.1% may be achieved.

According to the embodiment of the present invention, the temperature adjustor may further include a cold air provider. The cold air provider includes a cold air generator 231 disposed outside the printing chamber, a cold air inlet 232 configured to receive cold air from the cold air generator 231, and a cold air recovery hole 233 configured to recover cold air inside the printing chamber 100. The cold air inlet 232 and the cold air recovery hole 233 may be formed to be holes passing through the inside and outside of the printing chamber 100.

The cold air inlet 232 is disposed at a bottom of the second space P2. The cold air inlet 232 may be formed to pass through a corresponding location of the casing wall 106 of the printing chamber 100 in the rear of the auxiliary circulation fan 330. The cold air recovery hole 233 is disposed at a top of the first space P1. The cold air recovery hole 233 may be formed to pass through the top surface 104 of the first space P1 of the printing chamber 100 in front of the circulation fan 310.

The cold air injected from the cold air generator 231 into the cold air inlet 232 circulates toward the first space P1 via the second space P2 and then is discharged outward from the printing chamber 100 through the cold air recovery hole 233. The discharge of the cold air may be performed using a pump (not shown).

The controller 900 may receive a sensing value of the temperature sensor 240 which senses a temperature inside the printing chamber 100 and control a cold air injection degree to the cold air inlet 232 and a cold air discharge degree from the cold air recovery hole 233. The controller 900 may maintain the temperature inside the printing chamber 100 to be room temperature or lower, for example, to be 0° C. to 4° C.

In some cases, it is necessary that the second output module 2 disposed in the second space P2 performs output at a temperature of room temperature or lower depending on properties of biomaterials. That is because a layer may not be stably formed at room temperature depending on properties of biomaterials. The cold air supplied from the cold air generator 231 may be injected into the printing chamber 100 and adjust the temperature inside the printing chamber 100 according to properties of biomaterials so as to form an exquisite layer of biomaterials which is output.

FIG. 6 is an incision diagram illustrating the space below the bottom surface of the printing chamber of FIG. 2.

Referring to FIG. 6, a bottom surface opening 120 is formed at the bottom surface 101 of the printing chamber 100 and a bed 130 is disposed above the bottom surface opening 120. The bed 130 moves within a movement region allowed by the bottom surface opening 120. A top surface of the bed 130 is formed to allow an output plate 131 on which output is formed to be fixed at a determined location.

The bed 130 is connected to a horizontal movement unit 132 installed at a bottom of the printing chamber 100. The horizontal movement unit 132 is connected to the bed 130 and configured to move the bed 130 in an X-axis direction and a Y-axis direction. A bottom part of the bed 130 is fixed to the horizontal movement unit 132. In the specification, the bed 130 includes both a part disposed inside the printing chamber and to which the output plate 131 is coupled and the bottom part connected to the horizontal movement unit 132.

According to the embodiment, bellows 810 are installed between the bottom part of the bed 130 and an inner circumferential surface of the bottom surface opening 120. The bellows 810 may include a ductile material such as silicone and the like. The bed 130 is disposed above a central hole of the bellows 810, and the bottom part extends below the bellows 810 through the central hole and is connected to the horizontal movement unit 132. A circumferential surface of the central hole is fixed to the bottom part of the bed 130 to be sealable. Accordingly, the bellows 810 covers a space between the bed 130 and the inner circumferential surface of the bottom surface opening 120 and isolates the inside of the printing chamber 100 from the space below the printing chamber 100.

Since the bellows 810 is deformed due to elasticity, the bed 130 is allowed to move in the X-axis direction and the Y-axis direction and foreign matter is prevented from moving between upper and lower sides of the bellows 810 at the same time. Accordingly, it is possible to prevent external contaminant or particles generated while the horizontal movement unit 132 is operated from flowing in through the bottom surface opening 120.

According to the embodiment, in the space below the bottom surface 101 of the printing chamber 100, a fan heater 700 configured to reduce a temperature difference between the inside of the printing chamber 100 and the space below the bottom surface 101 of the printing chamber 100 may be provided. The fan heater 700 may be, for example, a positive temperature coefficient (PTC) fan heater and may be attached to one sidewall formed in the space below the bottom surface 101 of the printing chamber 100. However, a type or location of the fan heater 700 may be arbitrarily determined.

The bellows 810 may be plated with platinum. The bellows 810 is formed of an elastic material such as silicone such that foreign matter may be attached thereto due to viscosity. Platinum-plating of the bellows 810 may release viscosity so as to prevent foreign matter and germs from being attached to the bellows 810 and to increase surface tension of the bellows. Accordingly, it is possible to prevent the bellows from being easily damaged by a pressure change inside the chamber. Antibacterial and sterilization performance of platinum acts advantageously in forming a sterilized environment inside the printing chamber.

The controller 900 may receive a sensing value from the temperature sensor 240 configured to sense the temperature inside the printing chamber 100 and control turning-on/off of the fan heater 700. The inside of the printing chamber 100 which has high temperature and humidity and the outside of the printing chamber 100, where it is not, are divided by only the bellows 810 which is thin. Accordingly, when a temperature difference between the inside of the printing chamber 100 and the bottom part increases, dew condensation is caused by the temperature difference between the inside and outside of the printing chamber 100 such that condensation water is formed inside the chamber. When the temperature inside the printing chamber 100 is the set value or higher, the controller 900 operates the fan heater 700 and increases a temperature of the space below the printing chamber 100 so as to release the temperature difference. For example, the fan heater 700 may control the temperature of the space below the bottom surface 101 of the printing chamber 100 to be 37° C. Accordingly, it is possible to prevent dew condensation from being formed on the bellows 810 and to prevent cells cultivated inside the chamber 100 from being contaminated and having an influence on an experimental result.

Meanwhile, a top surface opening 140 may be formed in the second space P2 of the printing chamber 100. The top surface opening 140 has, for example, a circular cross section. A movement unit 820 configured to allow the second output module 2 to move in a second direction may be mounted in the top surface opening 140. The movement unit 820 may include an elastic rotary sealing packing 821, and the rotary sealing packing may be fitted into the top surface opening 140 of the printing chamber 100 and close the top surface opening 140.

The bellows 810 and the rotary sealing packing 821 seal the internal space of the printing chamber 100 and do not allow an internal environment of the chamber to be influenced by an external environment.

The scope of the present invention is not limited to the disclosure and expressions of the embodiment explicitly described above. Also, it is added that the scope of the present invention can not be restricted by changes or substitutes which are obvious in the art.

DESCRIPTION OF REFERENCE NUMERALS

10: case
100: printing chamber
210: heater
220: water jacket
310: circulation fan
320: air guide portion
330: auxiliary circulation fan
322: outlet
340: filter
410: tray
420: auxiliary humidification heater
510: $CO_2$ tank
531: regulator
700: fan heater
900: controller
P1: first space
P2: second space

The invention claimed is:

1. A chamber environment controlling apparatus for a three-dimensional bioprinter comprising a printing chamber having an internal space in which printing is performed and which is defined by wall surfaces including sidewalls, and a bottom surface, the apparatus comprising:
a temperature adjustor including a heater configured to heat the internal space of the printing chamber; and
an air circulator including an air guide portion extending from an outside of the printing chamber along a sidewall on one side and formed so that air flowing in through an inlet moves along an inside, is heated by the temperature adjustor, and is discharged into the internal space of the printing chamber through an outlet, a circulation fan configured to circulate air along the air guide portion, and a filter configured to filter the air circulating along the air guide portion,
wherein a bottom surface opening is formed in the bottom surface of the printing chamber and platinum-plated bellows configured to isolate the inside of the printing chamber from a space below the bottom surface of the printing chamber by covering a space in an inner circumferential surface of the bottom surface opening are included, and
wherein a fan heater configured to reduce a temperature difference between the inside of the printing chamber and the space below the bottom surface of the printing chamber is provided in the space below the bottom surface of the printing chamber.

2. The apparatus of claim 1, wherein the temperature adjustor includes a water jacket which is provided outside the sidewall of the printing chamber and accommodates water, and
wherein the water jacket is formed to surround the air guide portion between the sidewall on one side of the printing chamber and the water jacket.

3. The apparatus of claim 1, wherein the filter is installed in a filter housing, and the filter housing is detachably mounted in the inlet inside the printing chamber.

4. The apparatus of claim 1, comprising a humidity adjustor including a tray provided on a side of the outlet of the air guide portion and configured to accommodate water so as to adjust humidity inside the printing chamber.

5. The apparatus of claim 4, wherein the outlet of the air guide portion is formed between the sidewall of the printing chamber and a bottom surface of the printing chamber, and the tray is at least partially inserted into the air guide portion through the outlet.

6. The apparatus of claim 5, wherein the humidity adjustor comprises an auxiliary humidification heater disposed below the tray and configured to heat the water accommodated in the tray.

7. The apparatus of claim 6, wherein the auxiliary humidification heater is disposed in a space below the bottom surface of the printing chamber.

8. The apparatus of claim 1, wherein the air circulator further comprises an auxiliary circulation fan provided on the sidewall of the printing chamber on a side opposite the air guide portion.

9. The apparatus of claim 1, wherein the temperature adjustor further comprises a cold air provider including a cold air generator disposed outside the printing chamber, a cold air inlet formed in the printing chamber to receive cold air from the cold air generator, and a cold air recovery hole formed in the printing chamber to recover cold air inside the printing chamber.

10. The apparatus of claim 1, comprising:
a $CO_2$ sensor configured to sense $CO_2$ concentration inside the printing chamber;
a $CO_2$ adjustor including a $CO_2$ tank in which $CO_2$ gas is stored, a $CO_2$ gas inlet formed in the printing chamber and through which $CO_2$ gas is injected from the $CO_2$ tank into the printing chamber, a $CO_2$ balance adjusting hole formed in the printing chamber and configured to adjust the $CO_2$ concentration inside the printing chamber, and a regulator disposed on an inflow path of the $CO_2$ gas; and
a controller configured to adjust an inflow rate of $CO_2$ gas along a circulation path by controlling an operation of the regulator.

* * * * *